US012738696B2

(12) United States Patent
Hishinuma

(10) Patent No.: US 12,738,696 B2
(45) Date of Patent: Sep. 15, 2026

(54) ELECTRICAL CONNECTOR HAVING A REINFORCEMENT STRUCTURE

(71) Applicant: TOYOTA JIDOSHA KABUSHIKI KAISHA, Toyota (JP)

(72) Inventor: Shoji Hishinuma, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 18/528,170

(22) Filed: Dec. 4, 2023

(65) Prior Publication Data

US 2024/0275107 A1 Aug. 15, 2024

(30) Foreign Application Priority Data

Feb. 9, 2023 (JP) ................................ 2023-018635

(51) Int. Cl.
*H01R 13/6585* (2011.01)
*H01R 13/502* (2006.01)

(52) U.S. Cl.
CPC ....... *H01R 13/6585* (2013.01); *H01R 13/502* (2013.01); *H01R 2201/26* (2013.01)

(58) Field of Classification Search
CPC .............. H01R 13/6585; H01R 13/502; H01R 2201/26; H01R 13/73; H01R 13/533; H01R 13/52; H01R 13/629
See application file for complete search history.

(56) References Cited

U.S. PATENT DOCUMENTS 6,896,528 B2 * 5/2005 Kubota ................ H01R 13/639 439/157
8,737,043 B2 * 5/2014 Hughes .................... H05K 5/10 361/647
2006/0084314 A1 * 4/2006 Takizawa ............. H01R 25/006 439/352
2007/0087599 A1 4/2007 Sasaki et al.
2014/0141637 A1 * 5/2014 Miyakawa ........... H01R 13/639 439/246
2017/0373480 A1 12/2017 Matsumoto et al.
2018/0254575 A1 * 9/2018 Choi .................... H01R 13/518
2019/0193565 A1 6/2019 Yuki et al.
2020/0328552 A1 * 10/2020 Sawazaki ......... H01R 13/65912

FOREIGN PATENT DOCUMENTS

JP 2007-115443 A 5/2007
JP 2009038920 A * 2/2009
JP 2017-228502 A 12/2017
JP 2019-111982 A 7/2019
JP 2020173970 A * 10/2020 ......... H01R 13/6593
JP 2021-104756 A 7/2021
JP 2021-154835 A 10/2021

* cited by examiner

*Primary Examiner* — Edwin A. Leon
(74) *Attorney, Agent, or Firm* — Sughrue Mion, PLLC

(57) ABSTRACT

A structure of an electrical connector for preventing an interference with other members at the time of the collision, and for increasing rigidity of the electrical connector without increasing the number of parts. The electrical connector connects one end of a wire installed between a PCU and a rigid member to the PCU in a vehicle. The electrical connector comprises a cover covering the electrical wire. The cover comprises: an opposing section that is opposed to the rigid member; a sloping section that inclines such that an outer surface of the opposing section is withdrawn from the rigid member; and a reinforcement section that reinforces the sloping section.

4 Claims, 4 Drawing Sheets

ELECTRICAL CONNECTOR HAVING A REINFORCEMENT STRUCTURE

CROSS-REFERENCE TO RELATED APPLICATIONS

The present disclosure claims the benefit of Japanese Patent Application No. 2023-018635 filed on Feb. 9, 2023 with the Japanese Patent Office, the disclosures of which are incorporated herein by reference in its entirety.

BACKGROUND

Field of the Disclosure

Embodiments of the present disclosure relates to the art of a structure of an electrical connector for connecting and fixing an electrical wire or a cable to an electrical equipment mounted on a vehicle.

Discussion of the Related Art

JP-A-2019-111982 describes a structure of an electrical component mounted on a vehicle for protecting a connector of an electrical wire arranged at a rear-upper portion of a power control unit in the event of a collision of a vehicle. In the structure of the electrical component described in JP-A-2019-111982, a power control unit (hereinafter abbreviated as PCU) is fixed to an upper portion of a transaxle accommodating a drive motor in a front compartment. An electrical connector for connecting an electrical wire or a wire harness to the PCU is attached to an upper portion of the PCU, and a cowl panel is disposed behind the PCU. In addition, a protector is arranged at an upper portion of PCU behind the electric connector. The protector comes into contact to the cowl panel to protect the electrical connector when the PCU is retracted in the event of a collision of the vehicle.

JP-A-2007-115443 describes a lever-type connector for preventing a locking member and an electrical wire from contacting to each other thereby limiting damages of the electric wire and preventing malfunctions of the locking member. The lever-type connector described in JP-A-2007-115443 comprises a cover attached to the connector housing, a lever rotatably attached to the connector housing, and the locking member arranged on the cover. The locking member is pushed to be deflected toward inside of the cover by the lever rotating from the standby position to the lock position. When the lever reaches the lock position, the deflected locking member reverts to normal shape thereby locking the lever. In addition, a lattice-shaped reinforcing rib is arranged on an inner surface of the cover.

JP-A-2017-228502 describes an electrical connector for preventing water intrusion into a hood. The electrical connector described in JP-A-2017-228502 comprises a housing fitted into a hood of a mating connector, and a contact held by the housing. In addition, an inclined surface having an inclination angle wider than 90° is formed in the housing. The inclined surface is adapted to cause water adhering to the housing to flow downwardly along the inclined surface.

As described in JP-A-2019-111982, conventionally, the PCU or an electronic control unit (hereinafter abbreviated as ECU) mounted on a vehicle has been structured separately from e.g., a housing of a transaxle or a motor. Whereas, in recent years, units or modules of so-called "electromechanical integrated structure" in which the PCU or the ECU and a transaxle or a motor are integrated have been developed so as to eliminate intermediate connecting components. In the "electromechanical integrated structure" unit shown in FIG. 1, for example, the height of the power control unit 101 (in the vertical direction in FIG. 1) is lower than that of the power control unit (PCU) 100 in the conventional separate structure. For example, a brake booster 102 is disposed behind the PCUs 100, 101 (i.e., in the right side in FIG. 1). Therefore, when a collision of a front section of the vehicle (i.e., in the left side of FIG. 1) occurs, the rear surface 103 of the PCU 100, brackets (not shown) connecting the PCU 100 and the transaxle 104, and the brake booster 102 will interfere with one another in the conventional separate construction. Since rigidities of the rear surface 103 and the brackets of the PCU 100 are relatively high, damage of those members would not be so serious even if those members interfere with the brake booster 102 in the event of a collision. Whereas, in the unit having the "electromechanical integrated structure", the electrical connector 106 arranged on the upper surface 105 of the PCU 101 and the brake booster 102 may interfere with each other in the event of a collision. However, strength of the electrical connector 106 is structurally less than those of the bodies of the PCUs 100 and 101. In addition, it is not easy to secure a higher strength at the connection between the electrical connector 106 and the PCU 101. Therefore, in the unit having the "electromechanical integrated structure", the electrical connector 106 may be damaged by the collision, and consequently the electrode may be exposed, or a short circuit may occur. Since the position of the brake booster 102 is determined by the position of a brake pedal (not shown), it is not easy to change the position of the brake booster 102 in order to avoid interference in a collision. In addition, if the protector or the like as described in JP-A-2019-111982 is arranged, the number of parts will be increased thereby complicating the structure.

SUMMARY

Aspects of embodiments of the present disclosure have been conceived noting the above-explained technical problems, and it is therefore an object of the present disclosure to provide a simple structure of an electrical connector for preventing an interference of the electrical connector with other members in the event of a collision, and increasing rigidity and strength of the electrical connector without increasing the number of parts to limit damage resulting from the collision.

According to the exemplary embodiment of the present disclosure, there is provided an electrical connector, that connects an electrical wire installed at least partially between an electrical component and a rigid member electrically and fixedly to the electrical component. For example, the electrical component may be mounted on a vehicle in the vicinity of the rigid member. In order to achieve the above-explained objectives, according to the exemplary embodiment of the present disclosure, the electrical connector is provided with a cover as an outer shell that covers a connection between one end of the electrical wire and the electrical component. Specifically, the cover comprises: an opposing section being opposed to the rigid member in the cover attached to the electrical component; a sloping section that inclines in a direction such that an outer surface of the opposing section is withdrawn away from the rigid member at least partially; and a reinforcement section that reinforces the sloping section to bear a load resulting from a collision or an interference between the sloping section and the rigid member the in the event of a collision of the vehicle.

In a non-limiting embodiment, the cover may further comprise a frame section that ensures a strength of the cover, and the reinforcement section may include a reinforcement rib that is joined to the sloping section and the frame section to reinforce the sloping section.

In a non-limiting embodiment, the one end may cover the electrical wire between the electrical component and the rigid member. In addition, the cover may further comprise a protection wall that is joined to the opposing section between the opposing section and the electrical component to protect the electrical wire from the load applied to the opposing section in the event of a collision or an interference between the opposing section and the rigid member.

In other words, according to the exemplary embodiment of the present disclosure, there is provided an electrical connector arranged in a vehicle to be electrically connected to an electrical component. The electrical connector comprises: an electrical wire extending in one side of a first direction along a rear surface of the electrical component; and a cover that protrudes from the rear surface at least partially to cover a connection between the electrical wire and the electrical component. Specifically, the cover comprises: a sloping section (i.e., an inclined surface) that inclines from a top plate formed on the other side in the first direction toward said one side in the first direction; and a reinforcement rib extending in the second direction perpendicular to the first direction along the rear surface on an inner surface of the top plate.

In a non-limiting embodiment, the cover may further comprise a reinforcement rib extends in the third direction perpendicular to both of the first direction and the second direction on the inner surface of the top plate.

In a non-limiting embodiment, the cover may further comprise a protection wall formed such that a surface parallel to the rear surface extends from the top plate toward said one side in the first direction.

Thus, the electrical connector according to the exemplary embodiment of the present disclosure fixedly connects the electrical wire to the electrical component such as an inverter and a power control unit. As described, the cover of the electrical connector according to the present disclosure is provided with the sloping section (or an inclined surface) at the opposing section facing to the adjacent rigid member. Specifically, the sloping section is formed such that the surface of the opposing section is inclined at least partially in a direction in which the distance from the rigid member is increased. That is, the sloping section is inclined in a direction in which the rigid member diverges from the electrical connector when the electrical connector and the rigid member interfere with each other in the event of a collision (for example, a frontal collision or a side collision) of the vehicle. Further, the cover of the electrical connector according to the exemplary embodiment of the present disclosure is provided with a reinforcement section for reinforcing the sloping section. According to exemplary embodiment of the present disclosure, therefore, an interference between the electrical connector and the rigid member may be avoided even if the electrical component and the rigid member collide with each other in the event of a collision of the vehicle. In addition, a damage of the electrical connector by the load applied from the rigid member can be reduced.

Further, in the electrical connector according to the exemplary embodiment of the present disclosure, the reinforcement rib connecting the frame section and the sloping section of the cover serves as the reinforcement section. The frame section is a strength member forming the outer edge of the cover. Therefore, by connecting the frame section and the sloping section through reinforcement rib, the sloping section can be reinforced easily.

In the electrical connector according to the exemplary embodiment of the present disclosure, the cover comprises the protection wall that reinforces the opposing section of the cover to bear the load applied from the rigid member. Therefore, the electrical wire can be protected to limit the damage when the opposing section and the rigid member collide or interfere with each other.

For these reasons, according to the exemplary embodiment of the present disclosure, an interference between the electrical connector and the rigid member may be prevented at the time of the collision without increasing the number of parts and with a simple configuration. In addition, the rigidity and strength of the electrical connector are increased thereby reducing damages of the electrical connector and the electrical wire.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will be described with reference to the accompanying drawings. It is to be noted that the embodiments described below are merely examples of the present disclosure, which should not limit the present disclosure.

Figure 1:
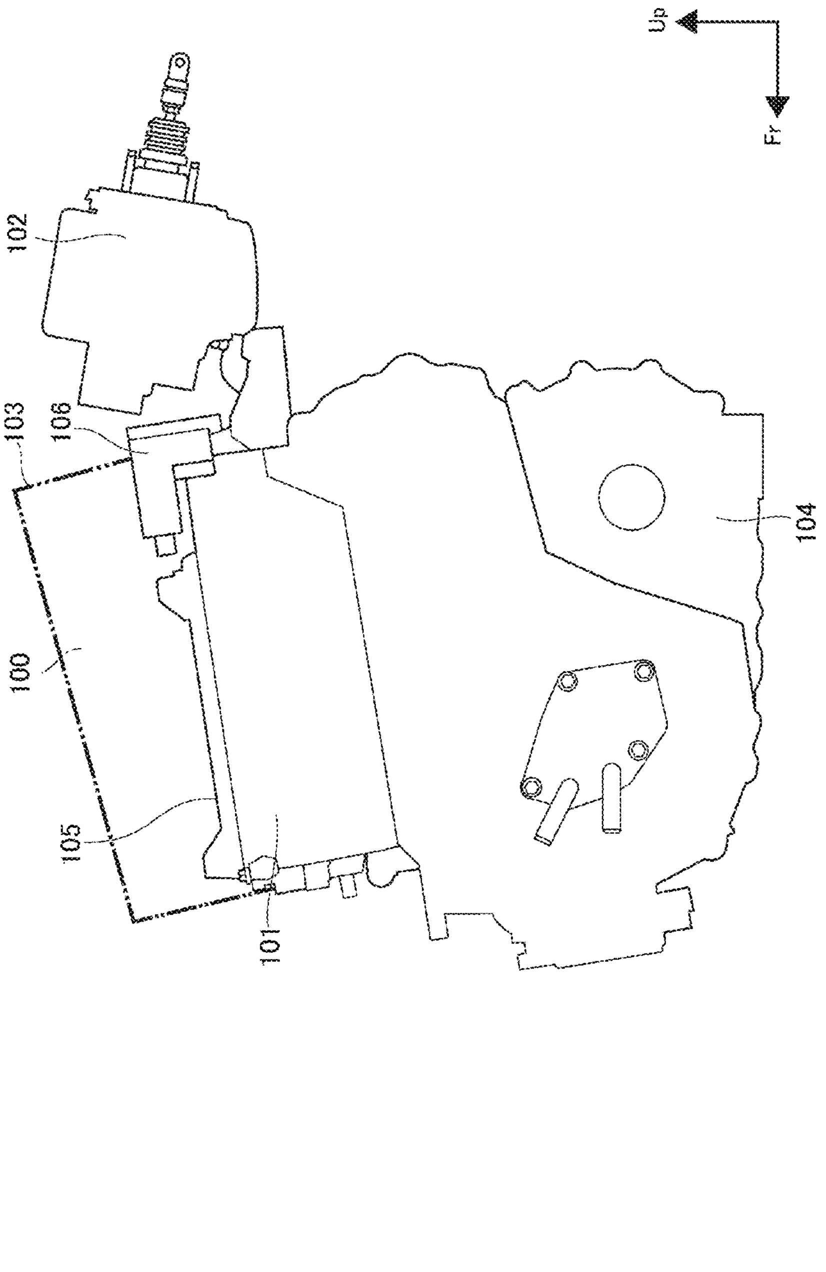
FIG. 1 PRIOR ART
FIG. 1 is a side view showing a difference in height between a conventional assembly in which a power control unit and a transaxle having independent structures are combined with each other and an assembly in which a power control unit and a transaxle having an integral structure.
Figure 2A:
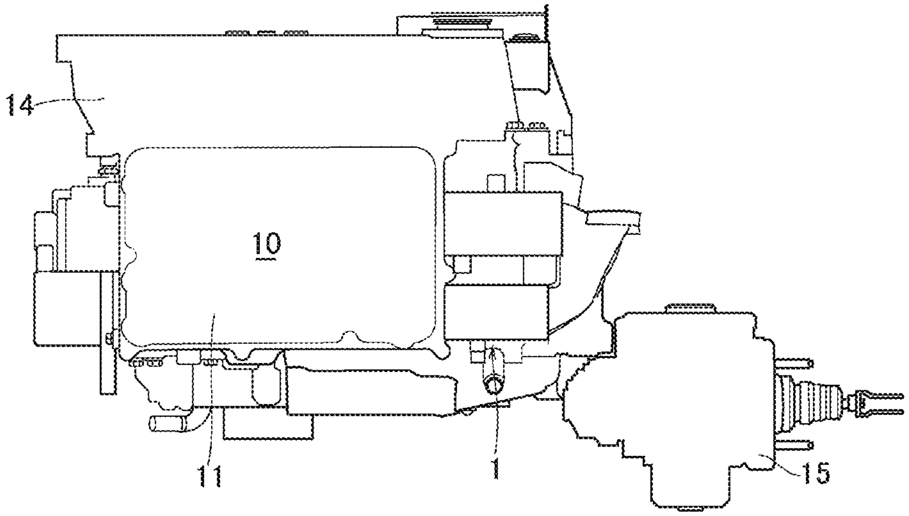
FIG. 2A is a top view of an assembly of a power control unit to which an electrical connector according to the present disclosure is attached and a transaxle mounted in the vicinity of a brake booster.
Figure 2B:
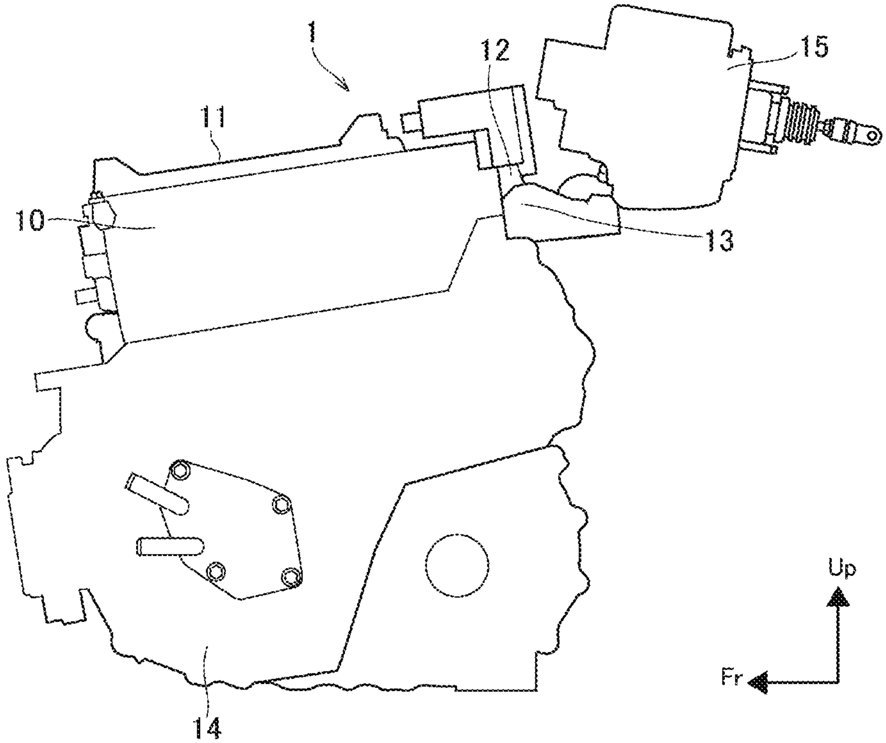
FIG. 2B is a side view of the assembly of the power control unit to which the electrical connector according to the present disclosure is attached and the transaxle mounted in the vicinity of the brake booster.

As shown in FIGS. 2A and 2B, the electrical connector 1 according to the exemplary embodiment of the present disclosure is attached to a power control unit (PCU) 10 mounted on a vehicle (not shown). In the embodiment shown in FIGS. 2A and 2B, the electrical connector 1 is attached to a corner between an upper surface 11 and a rear surface 12 of the PCU 10. The upper surface 11 is the uppermost portion of the PCU 10 in the vertical direction, and the rear surface 12 is opposed to an after-mentioned brake booster 15 that is located in the rear section of the vehicle. The electrical connector 1 electrically connects and fixes the electrical wire 13 to the PCU 10. According to the exemplary embodiment of the present disclosure, the electrical wire 13 wired to the PCU 10 includes a power line, a cable, a wire harness, and the like. The electrical wire 13 is installed between the PCU 10 and the brake booster 15 at least partially.

For example, the PCU 10 is an "electrical component" including inverters (not shown), converters (not shown), and the like. In the example shown in FIGS. 2A and 2B, the PCU 10 controls electric power exchanged between a battery (not shown) and a motor (not shown) arranged in a transaxle 14 of the vehicle. According to the exemplary embodiment of the present disclosure, a housing of the PCU 10 and a housing of the transaxle 14 are formed integrally to realize a so-called "electromechanical integrated structure". The unit of the PCU 10 and the transaxle 14 are arranged in the vicinity of the brake booster 15 in an engine compartment (not shown) of the vehicle. Specifically, a brake booster 15 is arranged behind the unit of the PCU 10 and the transaxle 14 (on the right side of FIGS. 2A and 2B). Therefore, in the event of a collision of the vehicle, the PCU 10 and the brake booster 15 may collide or interfere with each other.

The brake booster 15 serves as a rigid member of the exemplary embodiment of the present disclosure, and the brake booster 15 has a predetermined rigidity partially or entirely. Therefore, if the brake booster 15 collides or interferes with other member in the event of a collision of the vehicle, the other member may be damaged by the brake booster 15. According to the exemplary embodiment of the present disclosure, the rigid member is arranged at a position where it may collide or interfere with the PCU 10 in the event of a collision, and the definition of "collision" includes a frontal collision, a side collision, an oblique frontal collision, and an oblique rear-end collision. Therefore, members other than the brake booster 15 may serve as the "rigid members" depending on the structure of the vehicle and the situation of the collision.

Figure 3A:
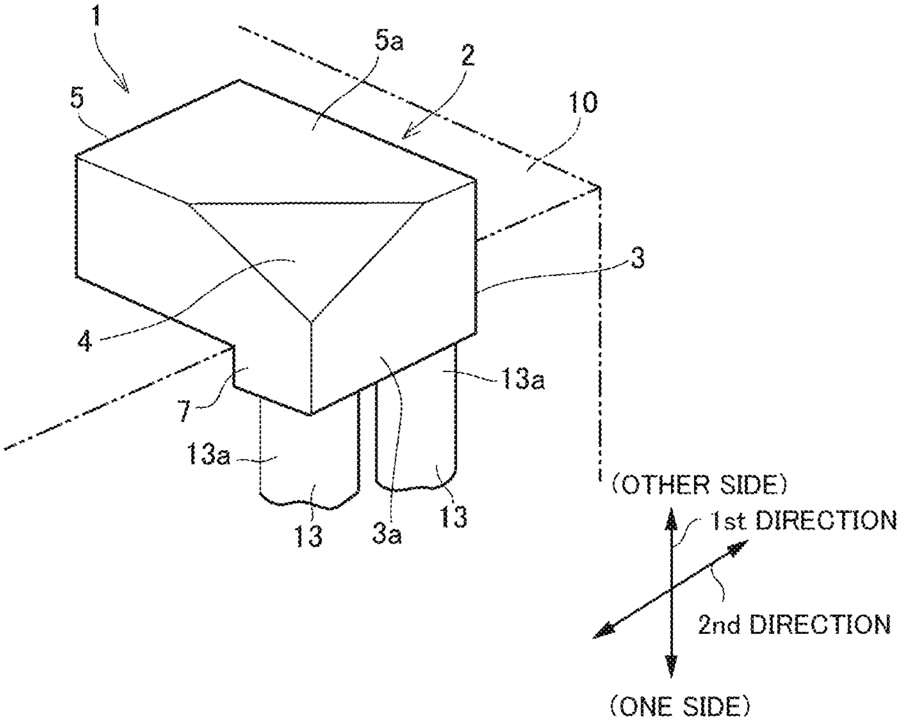
FIG. 3A is a perspective view showing an outer surface of the electrical connector according to the present disclosure attached to the power control unit, a sloping section formed on the electrical connector, and wires held in the electrical connector.
Figure 3B:
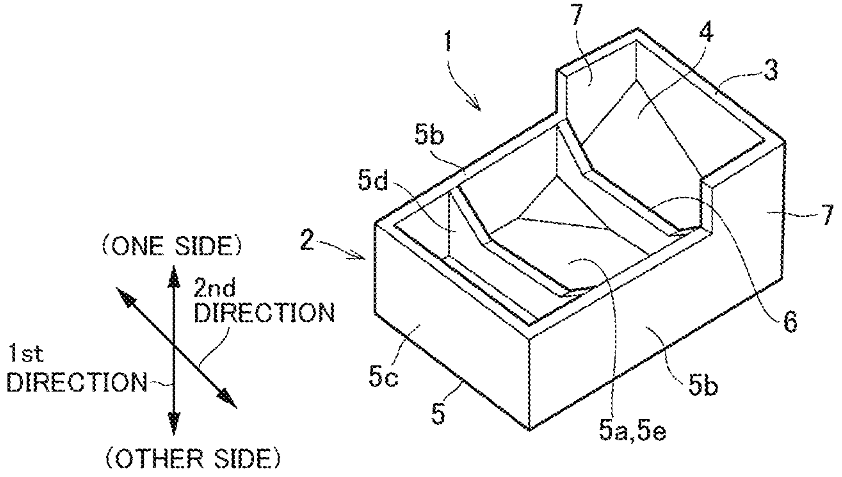
FIG. 3B is a perspective view showing a reinforcement section for reinforcing the sloping section formed inside of the electrical connector according to the present disclosure.

FIGS. 3A and 3B show a structure of the electrical connector 1 according to the exemplary embodiment of the present disclosure in more detail. The electrical connector 1 is provided with a cover 2 as an outer shell, and the cover 2 comprises an opposing section 3, a sloping section 4, a frame section 5, a reinforcement rib 6, and a protection wall 7. As shown in FIG. 3A, the cover 2 protrudes at least partially from the rear surface 12 of the PCU 10 to cover a connection (not shown) between one end 13*a* of the electrical wire 13 extending toward one side in the first direction along the rear surface 12 of the PCU 10 and the PCU 10.

In the electrical connector 1 attached to the PCU 10, the opposing section 3 is opposed to the brake booster 15. According to the embodiment illustrated in FIGS. 2A, 2B, 3A and 3B, the opposing section 3 is a plate portion having an outer surface 3*a* that is substantially parallel to the rear surface 12 of PCU 10. Aforementioned one end 13*a* of the electrical wire 13 is installed between the opposing section 3 and the rear surface 12 of the PCU 10.

The sloping section 4 is inclined in a direction such that the outer surface 3*a* of the opposing section 3 is withdrawn away from the brake booster 15 at least partially. That is, in the sloping section 4, a part of the outer surface 3*a* of the opposing section 3 is inclined in such a manner that a distance from the brake booster 15 is increased. In other words, the sloping section 4 is inclined from an after-mentioned top plate 5*a* formed on the other side in the first direction toward one side in the first direction along the rear surface 12 of the PCU 10. Therefore, when the electrical connector 1 and the brake booster 15 interfere with each other in the event of a collision of the vehicle, a component of the force applied to the electrical connector 1 from the brake booster 15 is established by the sloping section 4. Thus, the sloping section 4 is adapted to distribute the force received by the electrical connector 1 and to diverge the brake booster 15 from the electrical connector 1.

The frame section 5 is adapted to ensure the strength of the cover 2 of the electrical connector 1. According to the embodiment shown in 3B, the frame section 5 comprises the top plate 5*a*, a pair of side plates 5*b*, a rear plate 5*c*, a rib 5*d* connecting the top plate 5*a* to the side plates 5*b*, the opposing section 3, and a pair of after-mentioned protection walls 7.

The reinforcement rib 6 serves as a "reinforcement section" of the exemplary embodiment of the present disclosure to reinforce the sloping section 4 of the cover 2 so as to bear the load resulting from a collision between the sloping section 4 and the brake booster 15. To this end, as shown in 3B, the reinforcement rib 6 is joined to the sloping section 4 and the frame section 5. Specifically, the reinforcement rib 6 is formed on an inner surface 5*e* of the top plate 5*a* of the other side in the first direction. Specifically, the reinforcement rib 6 extends in the second direction perpendicular to the first direction along the rear surface 12 of the PCU 10 across the sloping section 4. Therefore, the force received by the sloping section 4 is distributed to each section of the frame section 5 through the reinforcement rib 6. Thus, the sloping section 4 is reinforced by the reinforcement rib 6.

The protection wall 7 is joined to the opposing section 3 of the cover 2 and the frame section 5 between the opposing section 3 and the rear surface 12 of the PCU 10. Specifically, as shown in FIGS. 3A and 3B, the protection wall 7 is formed such that the outer surface 3*a* that is parallel to the rear surface 12 of the PCU 10 extends from the top plate 5*a* toward one side in the first direction to cover the electrical wire 13. That is, in order to protect the electrical wire 13 accommodated between the opposing section 3 and the rear surface 12 of the PCU 10, the protection wall 7 is formed to bear the load applied to the opposing section 3 in the event of a collision or an interference between the opposing section 3 and the brake booster 15.

Figure 4:
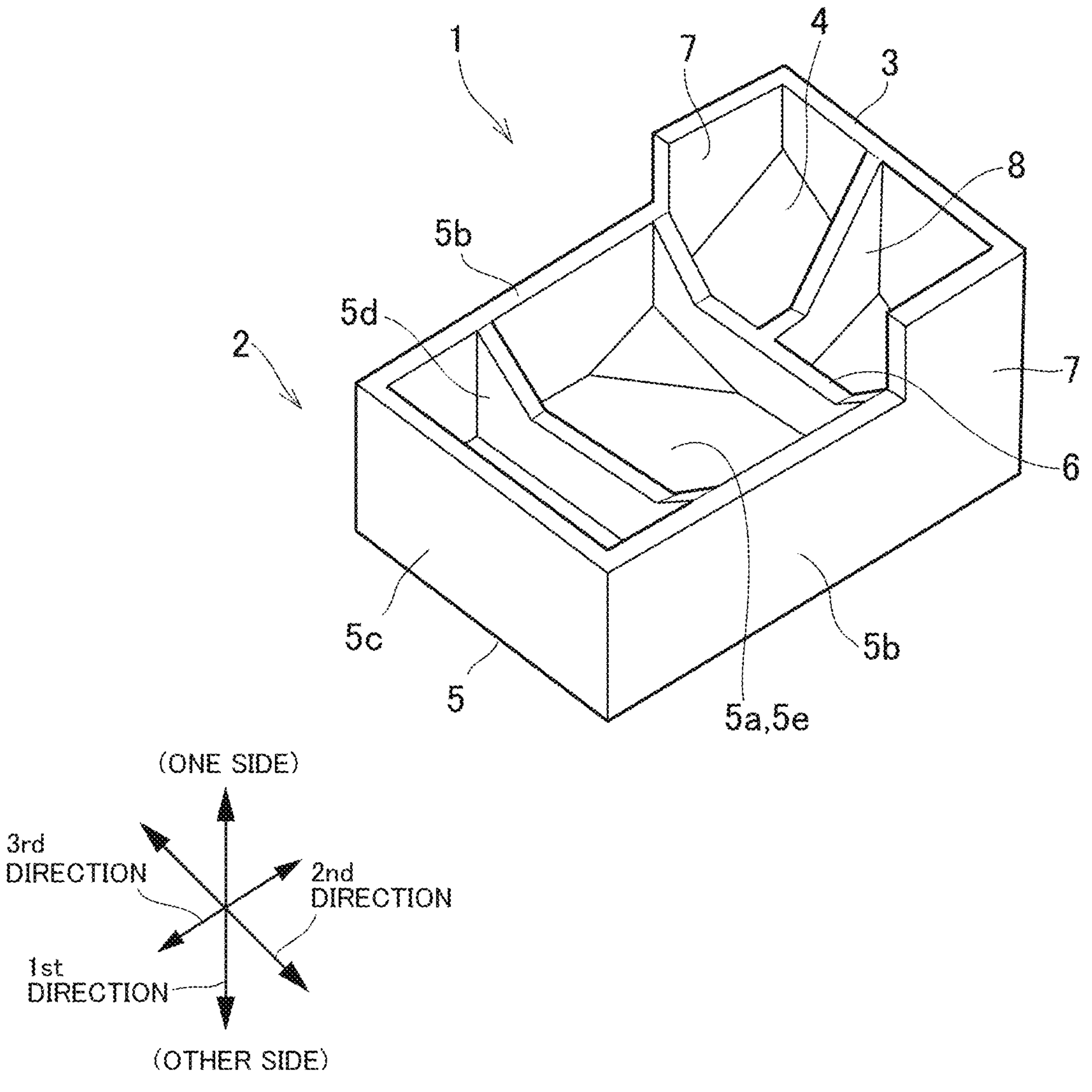
FIG. 4 is a perspective view showing another example of the reinforcement section of the electrical connector according to the present disclosure.

FIG. 4 shows another example of the reinforcement section according to the exemplary embodiment of the present disclosure. The reinforcement section shown in FIG. 4 comprises a reinforcement rib 8 joined to the sloping section 4 and the opposing section 3. The reinforcement rib 8 is also formed on the inner surface 5*e* of the top plate 5*a* of the other side in the first direction. Specifically, the reinforcement rib 8 extends in the third direction perpendicular to both of the first direction and the second direction while passing through the sloping section 4.

In the electrical connector 1 according to the exemplary embodiment of the present disclosure, the reinforcement ribs 6 shown in FIG. 3B may be formed on a plurality of locations. Likewise, the reinforcement ribs 8 shown in FIG. 4 may also be formed on a plurality of locations. Further, the reinforcement section may be formed by increasing the plate thickness of the sloping section 4 at least partially.

As described above, in the electrical connector 1 according to the embodiment of the present disclosure, the cover 2 is provided with the sloping section 4, the reinforcement rib 6, the reinforcement rib 8, and the protection wall 7. Specifically, the sloping section 4 is inclined in a direction in which the distance from the brake booster 15 is increased. Therefore, it is possible to avoid interference between the electrical connector 1 and the brake booster 15 in the event of a collision of the vehicle. That is, the brake booster 15 interfering with the electrical connector 1 may be diverged in a direction away from the electrical connector 1. Further, since the strength of the cover 2 against the load applied to the sloping section 4 from the brake booster 15 is enhanced by the reinforcement rib 6 and/or the reinforcement rib 8, the electrical connector 1 may be reliably protected. In addition, since the opposing section 3 covering the electrical wire 13 is reinforced by the protection wall 7, damage of the electrical wire 13 may be limited when the electrical connector 1 and the brake booster 15 collide or interfere with each other.

As described above, according to the exemplary embodiment of the present disclosure, it is possible to prevent interference between the electrical connector 1 and the adjacent rigid member such as the brake booster 15 in the event of a collision, without increasing the number of parts, and with a simple configuration. In addition, since the rigidity and strength of the electrical connector 1 are increased, damage to the electrical connector 1 and the electrical wire 13 may be reduced certainly.

What is claimed is:

1. An electrical connector that connects an electrical wire installed at least partially between an electrical component and a rigid member electrically and fixedly to the electrical component,
- wherein the electrical component is mounted on a vehicle in the vicinity of the rigid member,
- the electrical connector comprising:
- a cover as an outer shell that covers a connection between one end of the electrical wire and the electrical component,
- wherein the cover comprises:
- an opposing section being opposed to the rigid member in the cover attached to the electrical component;
- a top plate expanding perpendicular to the opposing section;
- a pair of side plates each of which includes a protection wall expanding perpendicular to the opposing section and the top plate;
- a sloping section that is formed in a corner region closest to the rigid member enclosed by the opposing section, the top plate, and one of the side plates, and that inclines in a direction such that an outer surface of the opposing section is withdrawn away from the rigid member at least partially; and
- a reinforcement section that reinforces the sloping section to bear a load resulting from a collision or an interference between the sloping section and the rigid member in the event of a collision of the vehicle by distributing the load to the outside of the corner region.

2. The electrical connector as claimed in claim 1,
- wherein the cover further comprises a frame section that ensures a strength of the cover,
- the frame section comprises the top plate, the pair of the side plates, the opposing section, a rear plate expanding perpendicular to the top plate and the side plates and parallel to the opposing section, and a rib connecting the top plate to the side plates, and
- the reinforcement section includes a reinforcement rib that is joined to the sloping section and the frame section to reinforce the sloping section.

3. The electrical connector as claimed in claim 1,
- wherein the cover covers the one end of the electrical wire between the electrical component and the rigid member, and
- the protection wall is interposed between the opposing section and the electrical component to bear the load applied to the opposing section.

4. The electrical connector as claimed in claim 2,
- wherein the cover covers the one end of the electrical wire between the electrical component and the rigid member, and
- the a protection wall interposed between the opposing section and the electrical component to bear the load applied to the opposing section.

* * * * *